US011904193B2

(12) United States Patent
Shade

(10) Patent No.: US 11,904,193 B2
(45) Date of Patent: Feb. 20, 2024

(54) ATTIC VENT FIRE PROTECTION SYSTEM

(71) Applicant: Amanda E. Shade, Chino Hills, CA (US)

(72) Inventor: Amanda E. Shade, Chino Hills, CA (US)

( * ) Notice: Subject to any disclaimer, the term of this patent is extended or adjusted under 35 U.S.C. 154(b) by 416 days.

(21) Appl. No.: 17/360,384

(22) Filed: Jun. 28, 2021

(65) Prior Publication Data

US 2021/0402233 A1 Dec. 30, 2021

Related U.S. Application Data

(60) Provisional application No. 63/045,647, filed on Jun. 29, 2020.

(51) Int. Cl.

| | |
|---|---|
| ***A62C 3/02*** | (2006.01) |
| ***A62C 37/36*** | (2006.01) |
| ***A62C 2/18*** | (2006.01) |
| ***A62C 2/12*** | (2006.01) |

(52) U.S. Cl.

CPC .............. *A62C 3/0214* (2013.01); *A62C 2/12* (2013.01); *A62C 2/18* (2013.01); *A62C 37/04* (2013.01)

(58) Field of Classification Search

CPC ........... A62C 3/0214; A62C 2/12; A62C 2/18; A62C 37/04

See application file for complete search history.

(56) References Cited

U.S. PATENT DOCUMENTS

| | | | | |
|---|---|---|---|---|
| 3,646,877 | A | 3/1972 | Ellis | |
| 4,184,288 | A | 1/1980 | Magill et al. | |
| 4,760,773 | A | 8/1988 | Pezzulli | |
| 4,977,818 | A * | 12/1990 | Taylor | A62C 2/12 454/342 |
| 5,183,435 | A | 2/1993 | Galvez | |
| 5,931,233 | A * | 8/1999 | La Bonte | A62C 37/40 169/48 |
| 10,441,832 | B1 * | 10/2019 | Trivelpiece | A62C 99/0072 |
| 10,830,464 | B1 | 11/2020 | Stevenson | |
| 2016/0320087 | A1 * | 11/2016 | Edwards | A62C 37/50 |
| 2019/0383021 | A1 | 12/2019 | Thompson et al. | |
| 2020/0054909 | A1 * | 2/2020 | Trivelpiece | G08B 17/06 |
| 2020/0188718 | A1 * | 6/2020 | Trivelpiece | A62C 37/36 |
| 2021/0402233 | A1 * | 12/2021 | Shade | A62C 3/0214 |

OTHER PUBLICATIONS

WO, PCT/US21/39370 ISR and Written Opinion, dated Sep. 24, 2021.

* cited by examiner

*Primary Examiner* — Daphne M Barry
*Assistant Examiner* — Frederick D Soski
(74) *Attorney, Agent, or Firm* — ONE LLP

(57) ABSTRACT

A system that deploys attic vent covers when there is the immediate threat of fire, as well as methods and device relating thereto, is disclosed. This system includes varied cover types and deployment methods to utilize with a range of attic vents found suitable for use in residential and commercial construction.

11 Claims, 6 Drawing Sheets

ATTIC VENT FIRE PROTECTION SYSTEM

CROSS-REFERENCE TO RELATED APPLICATION

The present application claims priority to U.S. Provisional Application No. 63/045,647, filed Jun. 29, 2020, the disclosure of which is hereby incorporated by reference in its entirety for all purposes.

FIELD OF INVENTION

The embodiments described herein generally relate to attic or void space vents of residential and non-residential structures; specifically, to fire prevention.

BACKGROUND

Wildfire damage to property has become an increasingly urgent and widespread issue. There are a number of known ways for home and building owners to protect their structures including brush clearance, construction material selection, sprinkler systems, etc. One preventative measure that has not been addressed is the entry of embers into attic space through vents. With the high winds that often accompany wildfire conditions, embers can travel miles. Ember intrusion into attic space is often a factor in determining which homes stay standing in a neighborhood and which catch fire. A frequently utilized construction component is the attic vent, which keeps attics cool in the summer and dry during winter. While these vents are an important feature of attic space, they provide a point of entry for these embers, which can smolder long after the fire front passes.

As there are a range of attic, wall and roof vents utilized in construction, a variety of closure and local deployment methods are needed to address this issue. Accordingly, needs exist for systems and components which can be systematically deployed by methods described herein for the purpose of fire prevention in ventilated spaces.

SUMMARY

The embodiments of the present disclosure are designed to provide an additional means of fire prevention by covering these attic vents when there is an immediate threat of fire or ember intrusion.

Other systems, devices, methods, features and advantages of the subject matter described herein will be or will become apparent to one with skill in the art upon examination of the following figures and detailed description. It is intended that all such additional systems, devices, methods, features, and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely. For example, due to the aforementioned necessary variety of vent cover types, the included figures represent a non-exhaustive sample of the covers.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

Figure 1A:
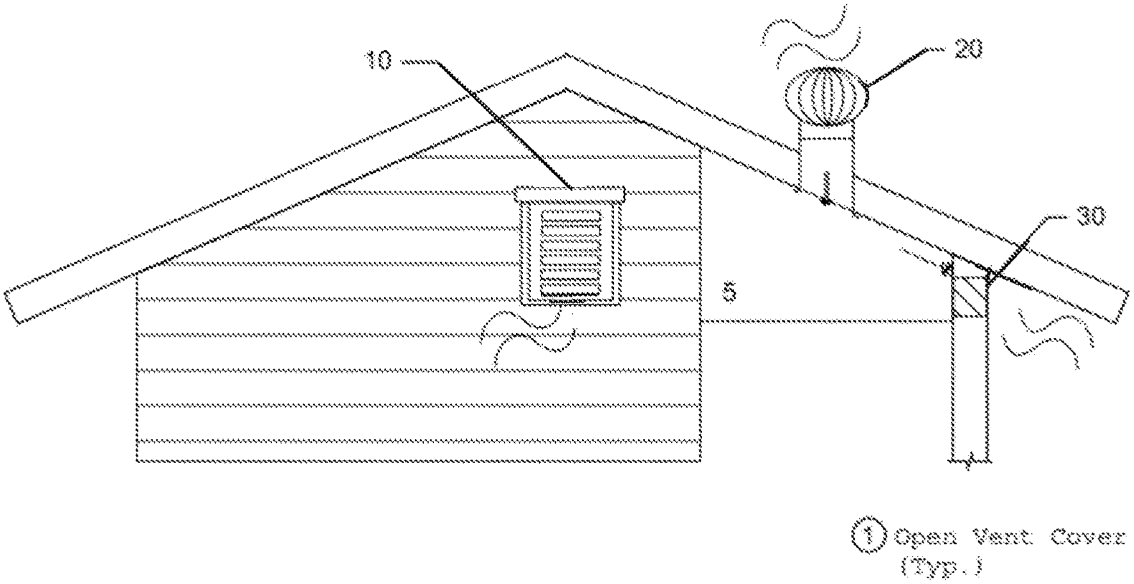
FIG. 1A depicts the various vent types of FIGS. 2 through 4 on a single structure in the normally open position with airflow allowed into an attic space.
Figure 1B:
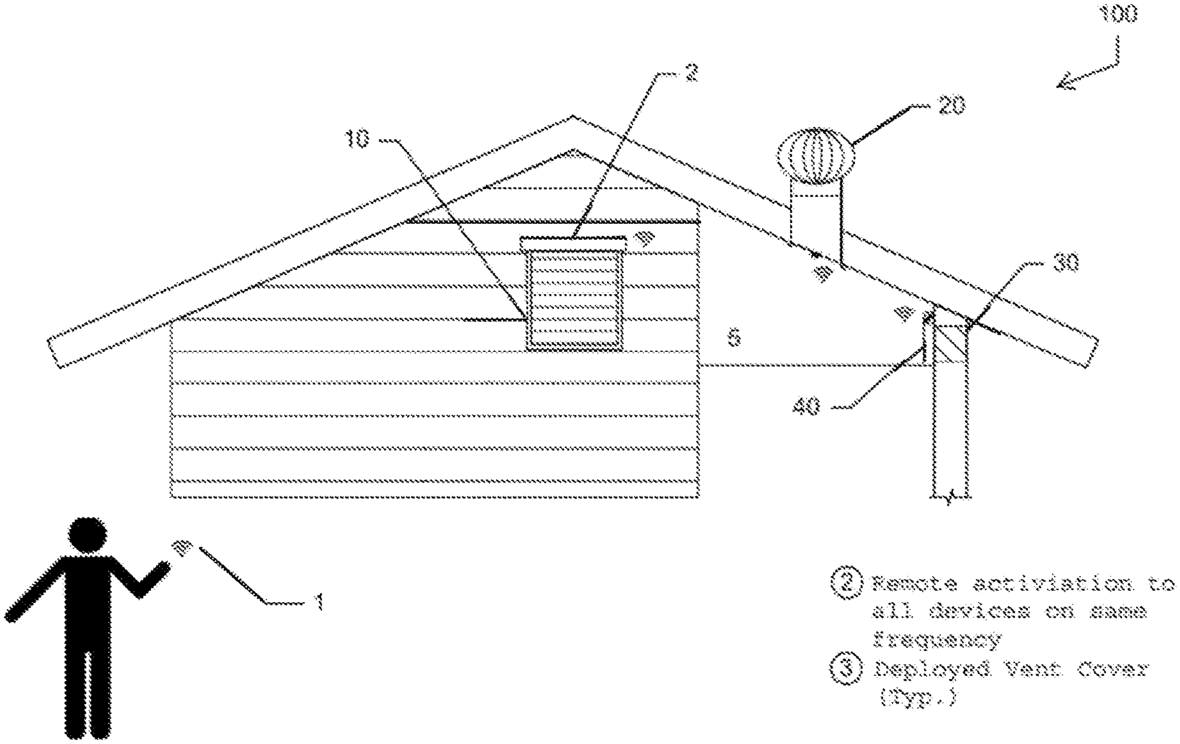
FIG. 1B depicts the system as configured with remote activation closing the associated cover devices at each of the vent types across the structure.

Referring to the drawings, FIG. 1A depicts an attic space 5 ventilated by three types of passive vents: wall louver or gable vent 10, turbine ventilator 20, and soffit or under-eave vent 30. Vents 10, 20, 30 provide airflow into and out of attic space 5 keeping the space cooler in summer and dryer in winter. In addition to vents 10, 20, 30 shown in this diagram, open vent covers are identified per FIG. 1A Note 1. System 100 is depicted in FIG. 1B, which shows each of the vent covers 40 deployed in the closed position blocking airflow into attic space 5. According to the embodiment shown in FIG. 1B Note 2, one methodology of overall activation of system 100 is via wireless remote control, with all devices set to activate on a shared frequency. Depending on owner preference and building construction, there can also be alternative activation methods (not depicted) including, but not limited to, hardwired with a switch, mechanical release, integration into a cell phone app or alternate "smart" home device, etc. In the event of high risk due to an encroaching wildfire, the system 100 would be deployed to cover all vent openings 10, 20, 30 into the attic space 5 preventing the intrusion of embers.

As mentioned in the Summary section of this application, there are large variety of vent types. FIGS. 2 through 4 depict a sample of these and example embodiments for closure devices. Similar to the total system activation method, the specific closure device will vary and will be dependent on the corresponding vent and building construction. The depictions are meant to be illustrative and other types and differently dimensioned closure devices can be implemented and are within the scope of the present disclosure.

Figure 2A:
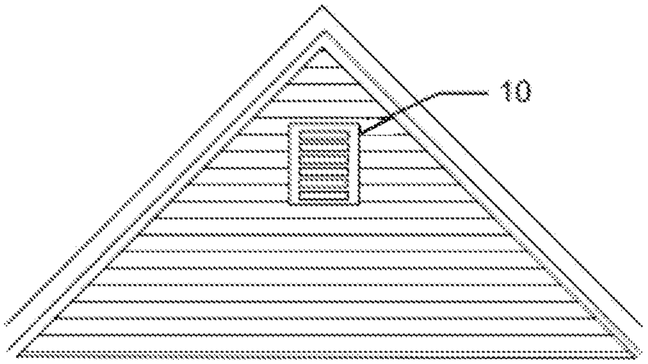
FIG. 2A is an elevation view of a wall louver or gable vent.
Figure 2B:
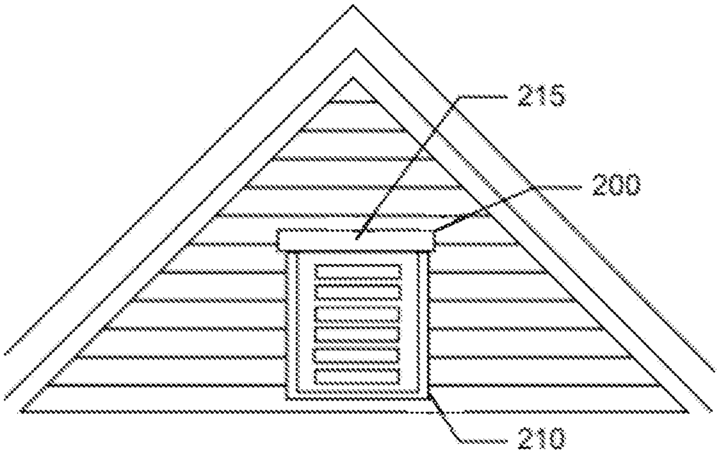
FIG. 2B is an elevation view of a framed, drop down type vent cover installed on the exterior shown in the normally open position.
Figure 2C:
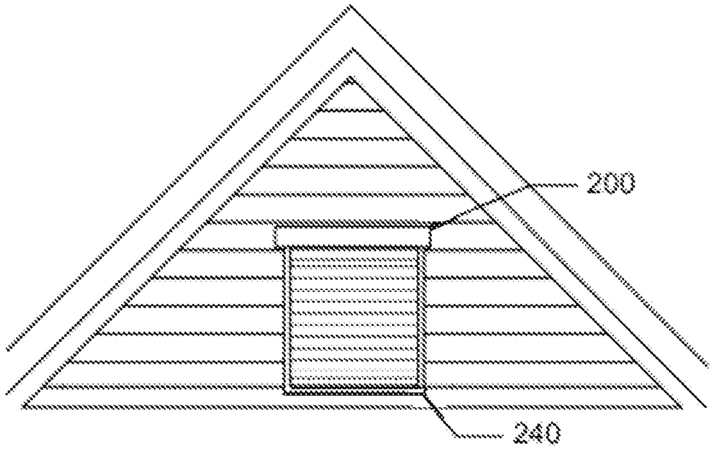
FIG. 2C is an elevation view of a framed, drop down type vent cover installed on the exterior shown deployed and in the closed position.
Figure 2D:
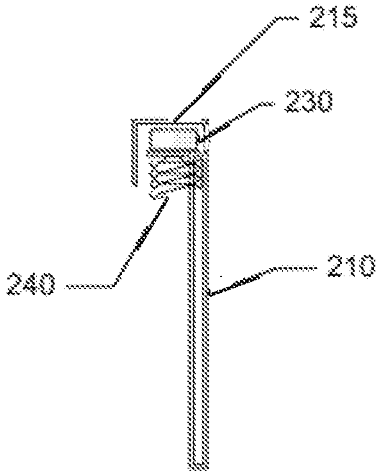
FIG. 2D is an enlarged section view of a framed accordion style drop down cover in the open position.
Figure 2E:
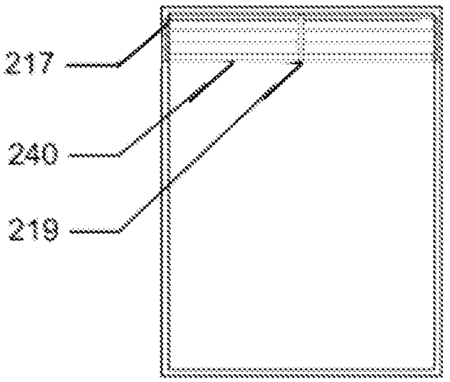
FIG. 2E is an enlarged elevation view of a framed accordion style drop down cover in the normally open position shown without the removable housing for clarity.
Figure 2F:
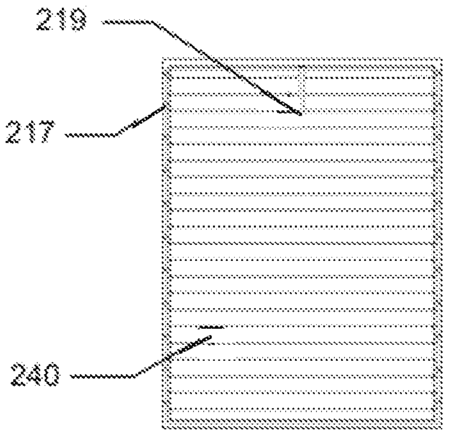
FIG. 2F is an enlarged view of a framed accordion style drop down cover deployed in the closed position shown without the removable housing for clarity.

FIG. 2A depicts a wall louver or gable vent 10. FIG. 2B shows wall louver or gable vent 10 with a drop-down cover device 200 installed on the exterior of the building. FIG. 2B shows cover device 200 in an open position, which can be configured to be a default position, in order to allow for regular airflow under normal conditions. According to some embodiments, cover device 200 can comprise a cover housing 215 and a cover frame 210. FIG. 2C shows cover device 200 deployed with cover 240 blocking airflow, and potential ember intrusion, into the attic space during high risk fire conditions. Further detail for this embodiment is depicted in FIG. 2D, which shows a side view of cover device 200. Per FIG. 2D, the depicted device is an accordion style cover 240 with linkages that align within frame 210. FIG. 2D also depicts a removable cover housing 215 that conceals the undeployed accordion style cover 240 and also contains the mechanical components 230 comprising a release mechanism, motor, battery (or alternate power source), and receiver (if remote control). FIG. 2E is a front view of the accordion style cover 240 in the normally open position shown without the housing 215 for clarity. As indicated in FIG. 2E, the linkages 217 align within the frame and the latch 219 is closed. FIG. 2F is a front view of same or similar cover 240 in the deployed position. Per FIG. 2F, linkages 217 have slid down the frame and latch 219 is shown as released. While this depiction represents an accordion style drop down cover, alternate embodiments of covers, such as rolling covers, can be implemented and are within the scope of the present disclosure. In the depicted embodiments, a cover is shown framed and mounted on the exterior of the structure. Depending on the construction of the structure, this mount may be framed or frameless and may be mounted on the exterior or interior of the structure. The image depicts a gravity driven release by simple latch; however, those of skill in the art will understand that other release mechanisms, such as spring-loaded release or motorized release are also possible and within the scope of the present disclosure.

Figure 3A:
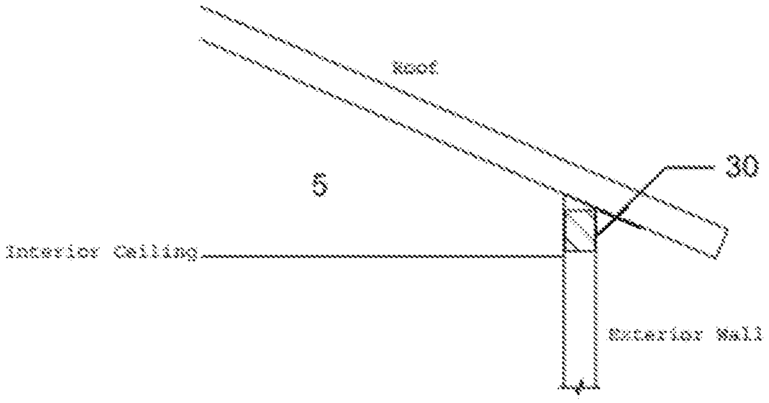
FIG. 3A is a section view of a pitched roof, attic space, and exterior wall with a soffit vent (also referred to as an under-eave vent).
Figure 3B:
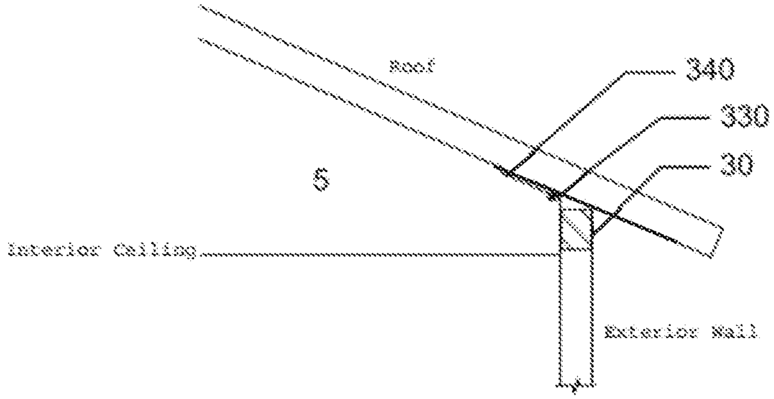
FIG. 3B is a section view of an interior mounted spring-loaded flat stock type vent cover shown in the normally open position.
Figure 3C:
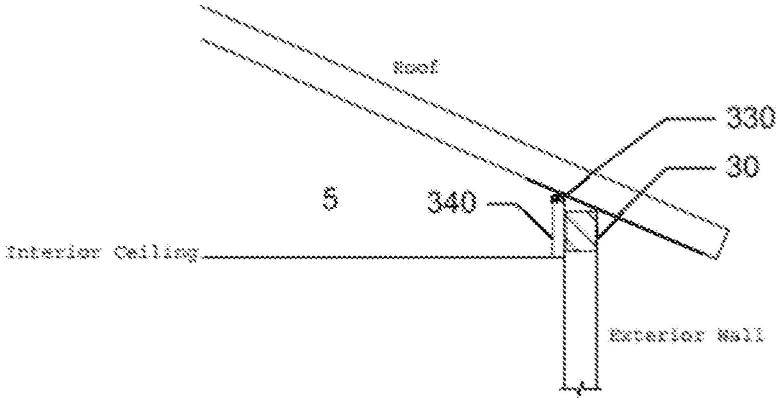
FIG. 3C is a section view of an interior mounted spring-loaded flat stock type vent cover shown deployed and in the closed position.

FIG. 3A depicts another vent style, which is a soffit vent or under-eave vent 30. The cover 340 depicted in FIG. 3B is flat stock shown in the open position. This cover 340 is shown installed within the attic space 5 but could also be installed on the exterior of the structure. As with each cover type, additional mechanical components 330 include the release mechanism, battery (or alternate power source), and receiver (if remote control). FIG. 3C shows cover 340 in the deployed position blocking airflow, and potential ember intrusion.

Figure 4A:
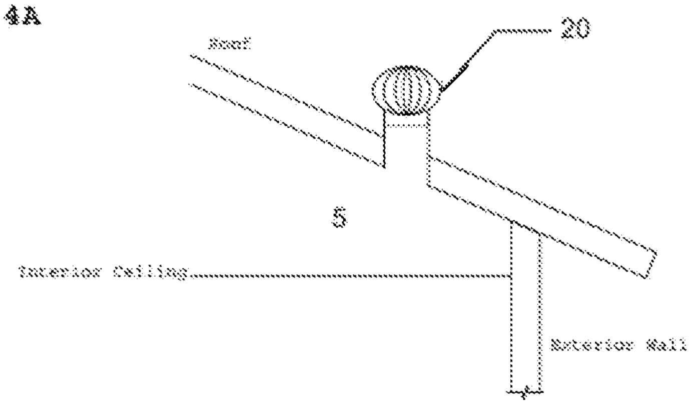
FIG. 4A is a section view of a pitched roof, attic space, and turbine type ventilator (also referred to as a whirlybird).
Figure 4B:
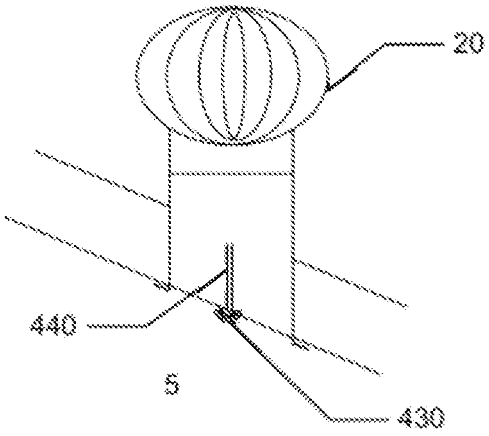
FIG. 4B is an enlarged section view of the turbine ventilator with a butterfly type damper with spring actuator shown in the normally open position.
Figure 4C:
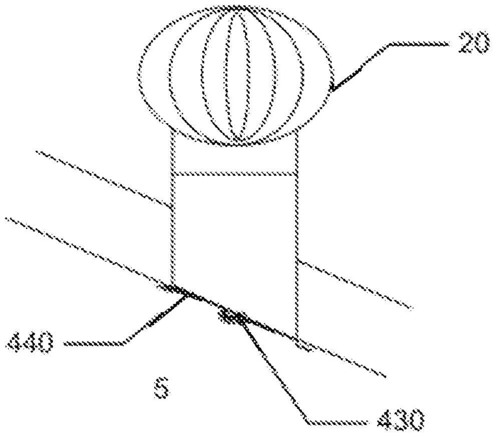
FIG. 4C is an enlarged section view of the turbine ventilator with a butterfly type damper with spring actuator shown deployed and in the closed position.

FIG. 4A depicts a turbine ventilator 20. Found on roofs, these are irregularly shaped and move with the wind making an external cover style impractical. With this considered, FIG. 3B depicts an internally mounted butterfly damper 440. Per FIG. 4B Note 2, this example reflects a butterfly damper held in the normally open position by tension of a spring-loaded release mechanism 430. FIG. 4C depicts this damper 440 in the deployed closed position preventing airflow beyond the turbine ventilator 20 into the attic space 5. In this case, the spring-loaded mechanism 430 would be released in line with the mechanism detail per FIG. 5A. In addition to turbine ventilators 20, there are other miscellaneous and irregular vent types, such as static vents, etc., that would utilize internally or externally mounted dampers or covers. While FIGS. 4A to 4C depicts a butterfly damper, those of skill in the art will recognize that other closure devices including but not limited to, flat stock, damper, multi-blade damper, etc., can be utilized and are fully within the scope of the present disclosure.

Figure 5A:
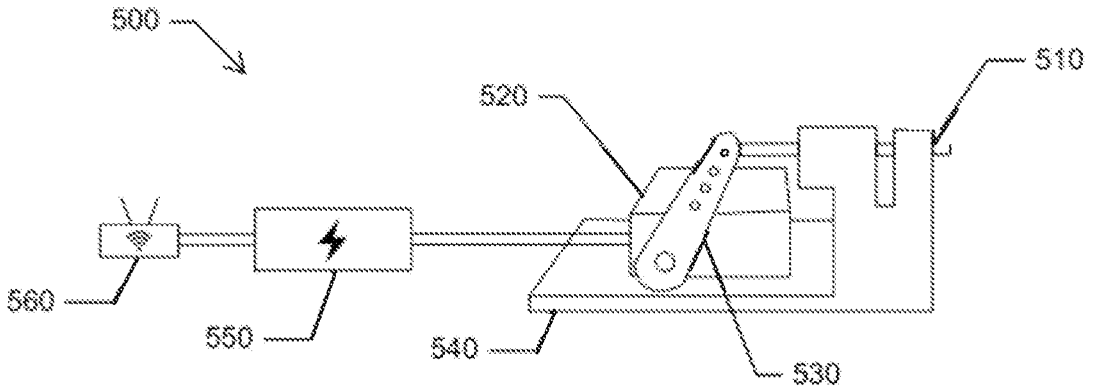
FIG. 5A is a depiction of a release mechanism configuration.

FIG. 5A is an enlargement of an example embodiment of a release mechanism 500 which can be utilized in combination with any of the previously described embodiments. Release mechanism 500 includes a motor 520 mounted on a platform 540. The motor arm 530 slides a pin 510 through a guide. Pin 510 can be configured to release a spring, latch, or other closure device. According to another aspect of the embodiments, a power source 550, such as a battery, can provide power to the motor 520. In other embodiments, power source 550 can comprise one or more of hardwired, hardwired with battery backup, solar/renewable with hardwire or battery backup, or mechanical release. According to some embodiments, an optional receiver 560 is provided for remote operation. In this example, receiver 560 would be set to the same frequency across devices on the structure and would be utilized for remote control deployment of the total system 100.

Each of these vent cover strategies, and previously mentioned alternates, could be adapted to suit the large variety of existing vent types found in construction. Dimensions of these covers are dependent on the size of the vents, themselves, and would be sized to provide full coverage of the vent openings. Depending on the construction of the building, these covers could be made of metal, treated wood, or any alternate fire-resistant material. Exterior mounted covers could be painted to match the style of the building making this system an aesthetically acceptable additional fire prevention feature.

Although the term "attic" is used herein with certain embodiments, those of skill in the art will appreciate that the embodiments described herein apply to other alternate ventilated spaces, such as crawl spaces, etc., and are fully within the scope of the present disclosure.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A fire prevention system for use with a ventilated space in a residential or non-residential structure, the system comprising:

one or more cover devices coupled with one or more corresponding vents associated with the ventilated space, wherein each of the one or more cover devices comprises:

a cover that transitions between an undeployed state and a deployed state, wherein the cover device permits airflow through the corresponding vent when the cover is in the undeployed state, and wherein the cover obstructs airflow through the corresponding vent when the cover is in the deployed state, and a release mechanism that transitions the cover from the undeployed state to the deployed state, wherein the release mechanism comprises:

a motor mounted on a platform;

a motor arm coupled with the motor and a pin, wherein the motor arm reciprocates the pin through a guide of the platform; and a power source coupled with the motor.

2. The system of claim 1, wherein each of the one or more cover devices further comprises a receiver coupled with the release mechanism, wherein the receiver transmits and receives wireless signals according to a wireless communication protocol.

3. The system of claim 2, wherein each receiver of the one or more cover devices transmits and receives wireless signals on a same frequency.

4. The system of claim 1, wherein the one or more corresponding vents include a wall louver vent or a gable vent, and wherein the one or more cover devices include a cover comprising a drop-down cover.

5. The system of claim 4, wherein the drop-down cover comprises an accordion style cover, a latch, and a plurality of linkages.

6. The system of claim 1, wherein the one or more corresponding vents include a turbine ventilator, and wherein the one or more cover devices include a cover comprising a butterfly damper.

7. The system of claim 6, wherein the release mechanism comprises a spring-loaded release mechanism.

8. The system of claim 1, wherein the one or more corresponding vents includes one or more of a wall louver vent, a gable vent, a turbine ventilator, a soffit vent, or an under-eave vent.

9. The system of claim 1, wherein the ventilated space is an attic space or a crawl space.

10. The system of claim 1, wherein the one or more corresponding vents include a soffit vent or an under-eave vent, and wherein the one or more cover devices include a cover comprising a flat stock cover.

11. The system of claim 1, wherein the release mechanism further comprises a receiver that transmits and receives wireless signals according to a wireless communication protocol.

* * * * *